Patented Sept. 25, 1951

2,568,692

UNITED STATES PATENT OFFICE 2,568,692

COPOLYMERS OF VINYL HALIDES AND HALOGENATED PROPENES

Fred E. Condo, El Cerrito, and Marguerite Naps, Oakland, Calif., assignors to Shell Development Company, San Francisco, Calif., a corporation of Delaware No Drawing. Application November 15, 1948, Serial No. 60,176

13 Claims. (Cl. 260—87.5)

This invention relates to a new class of artificial resins. More particularly the invention relates to a new class of copolymers of the vinyl halides and to a method for their production.

Specifically the invention provides a new and particularly useful class of resins which are obtained by copolymerizing vinyl halides, particularly vinyl chloride, with specific minor quantities of halogenated propenes having 1 to 3 halogen atoms attached to the carbon atoms of the propene molecule, at least one of the said halogen atoms being attached directly to one of the carbon atoms contained in the olefinic double bond, and not more than one halogen atom being attached to any one carbon atom. The novel copolymers of the invention possess many beneficial properties, such as superior resistance to age embrittlement and improved milling properties, which were entirely unexpected and could not have been foreseen from anything disclosed in the art. These improved properties enable the novel copolymers to be utilized for many important industrial applications described hereinafter.

The vinyl halide resins, particularly the vinyl chloride resins, have found considerable application in industry because of their many valuable properties. These resins, however, possess several weaknesses which have discouraged their utilization in many fields of application. It has been found, for example, that when articles produced from the vinyl halide resins are used for some time in the presence of heat they begin to stiffen and become brittle. This defect is a considerable drawback particularly in those cases where the resins are employed in the production of articles, such as seat covers, table covers, shower curtains, and the like, which must retain a certain degree of flexibility. Attempts have been made in the past to overcome this tendency of the vinyl halide resins to stiffen with age by adding various stabilizers to the said resins but this has not been entirely satisfactory as the addition of the stabilizers increases the cost of the resin, in some cases adversely affects some of the more desirable properties of the said resins, and usually brings about only a temporary solution of the problem as the stabilizer migrates or is massaged out of the material after a period of use.

It is, therefore, an object of the invention to provide a new class of copolymers of the vinyl halides. It is a further object of the invention to provide a novel class of copolymers of the vinyl halides which can resist age and heat embrittlement without the external addition of stabilizers. It is a further object to provide copolymers of the vinyl halides which possess improved milling properties. It is a further object to provide copolymers of the vinyl halides which possess a high degree of solubility in various organic solvents and can be used in the production of improved coating compositions and the like. It is a further object to provide a method for the production of copolymers of the vinyl halides and the above-described halogenated propenes. Other objects will be apparent from the detailed description of the invention given hereinafter.

It has now been discovered that these and other objects may be accomplished by copolymerizing the vinyl halides with specific minor quantities of the halogenated propenes having 1 to 3 halogen atoms attached to the carbon atoms of the propene molecule, at least one of the said halogen atoms being attached directly to one of the carbon atoms contained in the olefinic double bond, and not more than one halogen atom being attached to any one carbon atom. The resulting copolymers possess a surprising resistance to embrittlement and are able, without the addition of stabilizers, to withstand long periods of exposure to high temperatures without undergoing any great degree of stiffness. This superior property enables the copolymers of the invention to be used with great success in the production of many articles, which demand a high degree of resistance to this type of embrittlement. This improved property is also of advantage in the fabrication of the copolymers for it permits the said polymers to be exposed to high temperatures, such as are employed in extrusion methods, without becoming stiff, and permits the scrap polymers to be re-used after being exposed to high fabrication temperatures. The novel copolymers also display an unexpected improvement in their milling behavior. They are, for example, able to be milled at much lower temperatures to blend the resin and plasticizer than required for many of the known vinyl halide polymers and as a result there is less chance of the plasticized resin becoming discolored during the fabrication process.

The discovery that superior resins could be obtained from the vinyl halides by copolymerizing them with minor amounts of the halogenated propenes described above was indeed unexpected in view of the disclosure in the art that the said halogenated propenes are very difficult to polymerize and react with other unsaturated organic compounds only under extreme conditions to produce copolymers of little practical utility.

The halogenated propenes to be copolymerized with the vinyl halides are those having 1 to 3 halogen atoms attached to the carbon atoms of the propene molecule, at least one of the said halogen atoms being attached directly to one of the carbon atoms contained in the olefinic double bond, and not more than one halogen atom being attached to any one carbon atom. Examples of the halogenated propenes are 2-chloropropene-1, 1,2 - dichloropropene - 1, 2-bromopropene-1, 1,3-dichloropropene-1, 2-iodopropene-1, 1,3-dibromopropene-1, and 1,2,3-trichloropropene - 1. The preferred halogenated propenes to be used in producing the novel copolymers are the chlorinated propenes having two chlorine atoms attached to the propene molecule, one of the said chlorine atoms being attached to the number 2 carbon atom. Examples of this preferred group of halogenated propenes are 1,2-dichloropropene-1 and 2,3-dichloropropene-1.

Copolymers possessing the above-described superior properties are obtained only when the halogenated propenes are utilized in specific minor quantities. The desired results are obtained when the amount of the halogenated propenes is maintained between 2% and 15% by weight of the total monomer being polymerized, the remaining percentage, i. e. 98% to 85% by weight being made up of the desired vinyl halide. Preferably the halogenated propenes are combined with the vinyl halides in amounts varying from 2% to 10% by weight of the total monomer with the vinyl halide being maintained between 98% and 90% by weight.

The copolymers of the invention are prepared by heating the desired monomers together in the presence of a polymerization catalyst. The polymerization may be accomplished in bulk, in the presence of a solvent or diluent, or in an aqueous emulsion or suspension. If solvents are employed the substance may be a solvent for the reactants and polymer, or may be a solvent for the reactants and non-solvent for the polymer. Examples of solvents that may be utilized for the polymerization include hexane, cyclohexanone, benzene, butane, methyl ethyl ketone, dibutyl ether, and the like, and mixtures thereof.

The catalysts that may be employed in the copolymerization reaction may be any of the known polymerization catalysts, such as persulfuric acid, peracetic acid, perphthalic acid, potassium persulfate, ammonium persulfate, potassium percarbonate, potassium perphosphate, sodium perborate, diacyl peroxides, such as dibenzoyl peroxide, dicaprylyl peroxide, dilauroyl peroxide, benzoylacetyl peroxide, and dipropionyl peroxide, the alkyl peroxides, such as diethyl peroxide, tertiary butyl hydroperoxide and dipropyl peroxide, hydrogen peroxide, barium peroxide, magnesium peroxide, and zinc peroxide. Mixtures of catalysts may also be employed.

The amount of the catalyst employed will vary over a considerable range depending upon the particular reactants and conditions employed. In most cases the amount of catalyst will vary between 0.01% and 3% by weight of the material being polymerized. A preferred amount of catalyst will vary between .01% and 1% by weight.

The temperature employed in the copolymerization process will also vary over a considerable range but in most cases will be maintained between 35° C. and 100° C. A preferred temperature range is between 45° C. and 75° C. Atmospheric, reduced or superatmospheric pressures may be employed in the polymerization process.

If desired the polymerization may be conducted in the absence of oxygen, i. e. under a blanket of an inert gas, such as nitrogen, carbon dioxide, methane, and the like.

A particularly preferred method for producing the novel copolymers comprises polymerizing the desired monomers in an aqueous-alcoholic suspension. In this process the desired quantities of the vinyl halides and halogenated propenes are added to a mixture containing water, alcohol, a polymerization catalyst and preferably a suspension stabilizer, and the resulting mixture is heated to the desired temperature to complete the polymerization.

In this process the alcohol, such as methanol, and water are usually added in a ratio of about 1:2 to about 1:1. Preferred suspensions usually contain the water and alcohol in approximately equal volumes. The ratio of monomer mixture to the water-alcohol mixture is generally maintained smaller than 1 to 2 with a preferred range of from 1 to 2.5 to 1 to 4. These ratios are not critical, however, and larger or smaller amounts may be used if desired or necessary.

Suspension stabilizers, such as starch and cellulose derivatives, may also be added to the reaction mixture in minor amounts, preferably varying from 0.1% to 1% by weight of the monomers being polymerized.

Any of the above-described polymerization catalysts may be employed in the suspension polymerization but it is generally preferred to use the water-insoluble catalysts such as lauroyl peroxide, and the like. These catalysts may be used in the usual amounts of from 0.01% to 2% by weight of the monomer being polymerized.

Temperatures employed during the suspension polymerization will usually vary between 35° C. and 100° C. with a preferred range varying from 45° C. to 75° C.

The copolymers produced by the preferred suspension polymerization process will usually be obtained in the form of fine granules and may readily be recovered by any suitable method, such as filtration, etc. The particles may be washed with water or other solvents or solution for the removal of the catalyst residues, etc., and dried by the ordinary techniques.

The copolymers of the invention may be modified by incorporating therewith various materials, such as dyes, pigments, fillers, lubricants, plasticizers, and the like. Such materials may be added in any expedient manner before or after the copolymerization depending upon the effect of such material on the polymerization rate of the monomers or on the properties of the finished copolymer.

The polymerization reaction may be carried out either batchwise or as a semi-continuous or continuous process. One or more reactants may be added portionwise or continuously during the polymerization and the reactor can be discharged at intervals. Continuous operation is usually preferred as it offers the technical advantages of speed, economy of operation and accuracy of control of the reaction.

The copolymers described herein are adapted to a wide variety of uses because of their combination of the more highly desired properties of the homopolymers of the vinyl halides with a superior resistance to age and heat embrittlement as well as improved milling properties. They are, for example, ideally suited for the production of films or laminated sheets which are to be used for the manufacture of drapes, curtains, chair covers, table tops, etc. They also may be shaped into tubes, rods or massive articles under elevated temperature and pressures without undergoing any great change in stiffness. They may also be subjected to extrusion and to injection and compression molding in the presence or absence of added diluents and plasticizers. They are also useful in the molten form or solvent solution for the preparation of surface coatings, and the like.

To illustrate the manner in which the invention may be carried out the following examples are given. It is to be understood, however, that the examples are for the purpose of illustration and the invention is not to be regarded as limited to any of the specific conditions recited therein.

The stiffness of the resins produced in the following examples was determined according to ASTM test D747-43T. Parts disclosed in the examples are parts by weight.

Example I (a) A homopolymer of vinyl chloride was prepared by adding 100 parts of monomeric vinyl chloride to a mixture of 125 parts of water, 100 parts of methanol, 0.1 part of methylcellulose and 0.3 part of lauroyl peroxide and heating the resulting mixture at 50° C. for about 22 hours. The polymer granules formed in the reaction were separated by filtration and washed to remove the catalyst residue, etc. One hundred parts of the resulting polymer were milled with 50 parts of dioctyl phthalate at 140° C. for about 5 minutes and molded at 160° C. for 2 minutes. The molded resin was placed in an oven and heated to 160° C. for 2 hours. At the end of that period the plastic possessed a stiffness at 25° C. of 9200 pounds per square inch.

(b) A copolymer of vinyl chloride and 2-chloropropene was prepared by adding 96 parts of monomeric vinyl chloride and 4 parts of 2-chloropropene to a mixture of 125 parts of water, 100 parts of methanol, 0.1 part of methylcellulose and 0.3 part of lauroyl peroxide and heating the resulting mixture at 50° C. for 22 hours. 100 parts by weight of the resulting polymer was milled with 50 parts of dioctyl phthalate as described in (a) above and then molded at 160° C. for 2 minutes. The molded resin was heated in the oven at 160° C. for 2 hours and at the completion of that period was tested for stiffness by the method employed above. The plastic possessed a surprisingly low stiffness value of only 3300 p. s. i. The said plastic is able to withstand several more hours of heating at this temperature before there is any noticeable detrimental change in the stiffness of the said resin.

Example II

A copolymer of vinyl chloride and 2,3-dichloropropene was prepared by adding 98 parts of monomeric vinyl chloride and 2 parts of 2,3-dichloropropene to a mixture of 125 parts of water, 100 parts of methanol, 0.1 part of methylcellulose and 0.3 part of lauroyl peroxide and heating the mixture to 50° C. for 22 hours. One hundred parts of the resulting copolymer were milled with 50 parts of dioctyl phthalate at 140° C. and molded at 160° C. for 2 minutes. The resin showed a very low stiffness value after being heated in the oven at 160° C. for 2 hours.

Example III

A copolymer of vinyl chloride and 2-chloropropene was prepared by adding 98 parts of monomeric vinyl chloride and 2 parts of 2-chloropropene to a mixture of 125 parts of water, 100 parts of methanol, 0.1 part of methylcellulose and 0.3 part of lauroyl peroxide and heating the said mixture to 50° C. for 22 hours. One hundred parts of the resulting copolymer were milled with 50 parts of dioctyl phthalate at 140° C. and molded at 160° C. for 2 minutes. The molded resin showed a very low stiffness value after being heated in the oven at 160° C. for 2 hours.

Example IV

Copolymers of vinyl chloride and 2-chloropropene were prepared by adding the monomers in the proportions shown below to individual mixtures containing 125 parts of water, 100 parts of methanol, 0.1 part of methylcellulose and 0.3 part of lauroyl peroxide and heating the said mixtures to 50° C. for 22 hours:

| Exp. No. | Proportion of Halogenated Propenes | Proportion of Vinyl Chloride |
|---|---|---|
| | Parts | Parts |
| 1 | 6 | 94 |
| 2 | 10 | 90 |
| 3 | 15 | 85 |

Example V

A copolymer of vinyl chloride and 1,3-dichloropropene was prepared by adding 6 parts of monomeric 1,3-dichloropropene and 94 parts of monomeric vinyl chloride to the suspension described in Example III and heating the resulting mixture at 50° C. for about 22 hours.

Example VI

A copolymer of vinyl bromide and 1,2,3-trichloropropene-1 is prepared by adding 2 parts of 1,2,3-trichloropropene-1 and 98 parts of vinyl bromide to the suspension described in Example III and heating the resulting mixture at 50° for 22 hours.

We claim as our invention:

1. A process for copolymerizing vinyl chloride with 2-chloropropene-1 which comprises heating a mixture of polymerizable components consisting of 2% to 10% by weight of the polymerizable components of 2-chloropropene-1 and 98% to 90% by weight of the polymerizable components of monomeric vinyl chloride in an aqueous-alcoholic suspension containing a polymerization catalyst, said heating being conducted at a temperature between 45° C. and 75° C.

2. A process for copolymerizing vinyl chloride with 2,3-dichloropropene-1 which comprises heating a mixture of polymerizable components consisting of 2% to 10% by weight of the polymerizable components of 2,3-dichloropropene-1 and 98% to 90% by weight of the polymerizable components of monomeric vinyl chloride in the presence of a polymerization catalyst, said heating being accomplished at a temperature between 30° and 100° C.

3. A process for copolymerizing vinyl chloride and 1,3-dichloropropene-1 which comprises heating a mixture of polymerizable components consisting of 2% to 10% by weight of the polymerizable components of 1,3-dichloropropene-1 and 98% to 90% by weight of the polymerizable components of monomeric vinyl chloride in the presence of a polymerization catalyst, said heating being accomplished at a temperature between 30° C. and 100° C.

4. A process for copolymerizing a vinyl halide with a halogenated propene of the group consisting of 2-chloropropene-1, 2,3-dichloropropene-1 and 1,3-dichloropropene-1 which comprises heating a mixture of polymerizable components consisting of 2% to 15% by weight of the polymerizable components of the halogenated propene and 98% to 85% by weight of the polymerizable components of monomeric vinyl halide in the presence of a polymerization catalyst, said heating being accomplished at a temperature between 30° and 100° C.

5. A process for copolymerizing a vinyl halide with a halogenated propene which has 1 to 3 halogen atoms attached to the carbon atoms of the propene molecule, at least one of the said halogen atoms being attached directly to one of the carbon atoms contained in the olefinic double bond, and not more than one halogen atom being attached to any one carbon atom, which comprises heating a mixture of polymerizable components consisting of 2% to 15% by weight of the polymerizable components of the said halogenated propene and 98% to 85% by weight of the polymerizable components of the vinyl halide in the presence of a polymerization catalyst.

6. A copolymer comprising the product of polymerization of a mixture containing as sole polymerizable components 2-chloropropene-1 and vinyl chloride wherein the 2-dichloropropene-1 makes up from 2% to 10% by weight and the vinyl chloride from 98% to 90% by weight of the total polymerizable components.

7. A copolymer comprising the product of polymerization of a mixture containing as sole polymerizable components 2,3-dichloropropene-1 and vinyl chloride wherein the 2,3-dichloropropene-1 makes up from 2% to 10% by weight and the vinyl chloride from 98% to 90% by weight of the total polymerizable components.

8. A copolymer comprising the product of polymerization of a mixture containing as sole polymerizable components 1,3-dichloropropene-1 and vinyl chloride wherein the 1,3-dichloropropene-1 makes up from 2% to 10% by weight and the vinyl chloride from 98% to 90% by weight of the total polymerizable components.

9. A copolymer comprising the product of polymerization of a mixture containing as sole polymerizable components vinyl chloride and a chlorinated propene of the group consisting of 2-chloropropene, 1,3-dichloropropene, and 2,3-dichloropropene wherein the chlorinated propene makes up from 2% to 15% by weight and the vinyl chloride from 98% to 85% by weight of the total polymerizable components.

10. A copolymer comprising the product of polymerization of a mixture containing as sole polymerizable components a vinyl halide and a halogenated propene of the group consisting of 2-chloropropene, 1,3-dichloropropene, and 2,3-dichloropropene, the halogenated propene making up from 2% to 15% by weight and the vinyl halide from 98% to 85% by weight of the total polymerizable components.

11. A copolymer comprising the product of polymerization of a mixture containing as sole polymerizable components a vinyl halide and a chlorinated propene which possesses two chlorine atoms attached to carbon atoms of the propene molecule, at least one of the said chlorine atoms being attached to the number 2 carbon atom, and not more than one chlorine atom being attached to any one carbon atom, the chlorinated propene making up from 2% to 15% by weight and the vinyl halide from 98% to 85% by weight of the total polymerizable components.

12. A copolymer comprising the product of polymerization of a mixture containing as sole polymerizable components a vinyl halide and a halogenated propene which possesses 1 to 3 halogen atoms attached to carbon atoms of the propene molecule, at least one of the said halogen atoms being attached directly to one of the carbon atoms contained in the olefinic double bond, and not more than one halogen atom being attached to any one carbon atom, the halogenated propene making up from 2% to 15% by weight and the vinyl halide from 98% to 85% by weight of the total polymerizable components.

13. A copolymer defined in claim 12 wherein the halogenated propene makes up from 2% to 10% and the vinyl halide from 98% to 90% by weight of the total polymerizable components.

FRED E. CONDO.
MARGUERITE NAPS.

REFERENCES CITED

The following references are of record in the file of this patent:

UNITED STATES PATENTS

| Number | Name | Date |
|---|---|---|
| 2,325,060 | Ingersoll | July 27, 1943 |

FOREIGN PATENTS

| Number | Country | Date |
|---|---|---|
| 6,299 of 1912 | Great Britain | Apr. 10, 1913 |